Feb. 14, 1956  E. F. DEIBLER ET AL  2,735,067
PEAK POWER METER
Filed Nov. 18, 1954  2 Sheets-Sheet 2
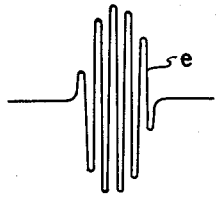
Fig. 2a.
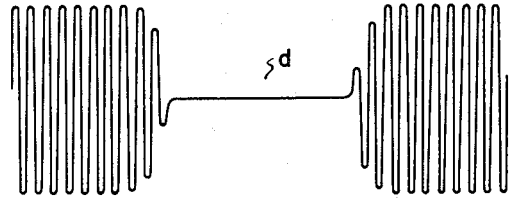
Fig. 2b.
Fig. 2c.
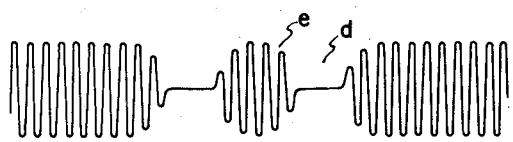
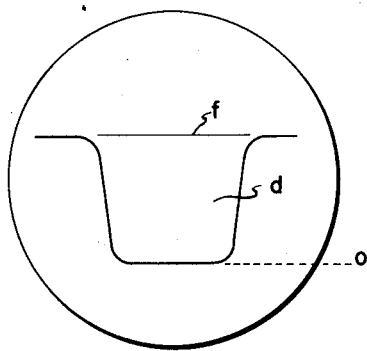
Fig. 3a.
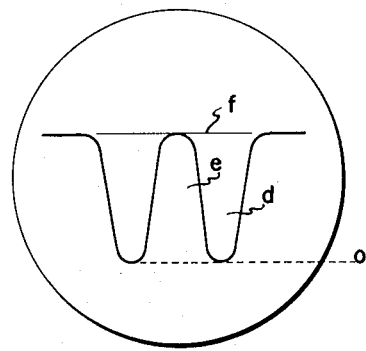
Fig. 3b.
INVENTORS
Elmer F. Deibler
Henry H. George
Robert E. Miller
BY Harold T. Stowell
ATTORNEY

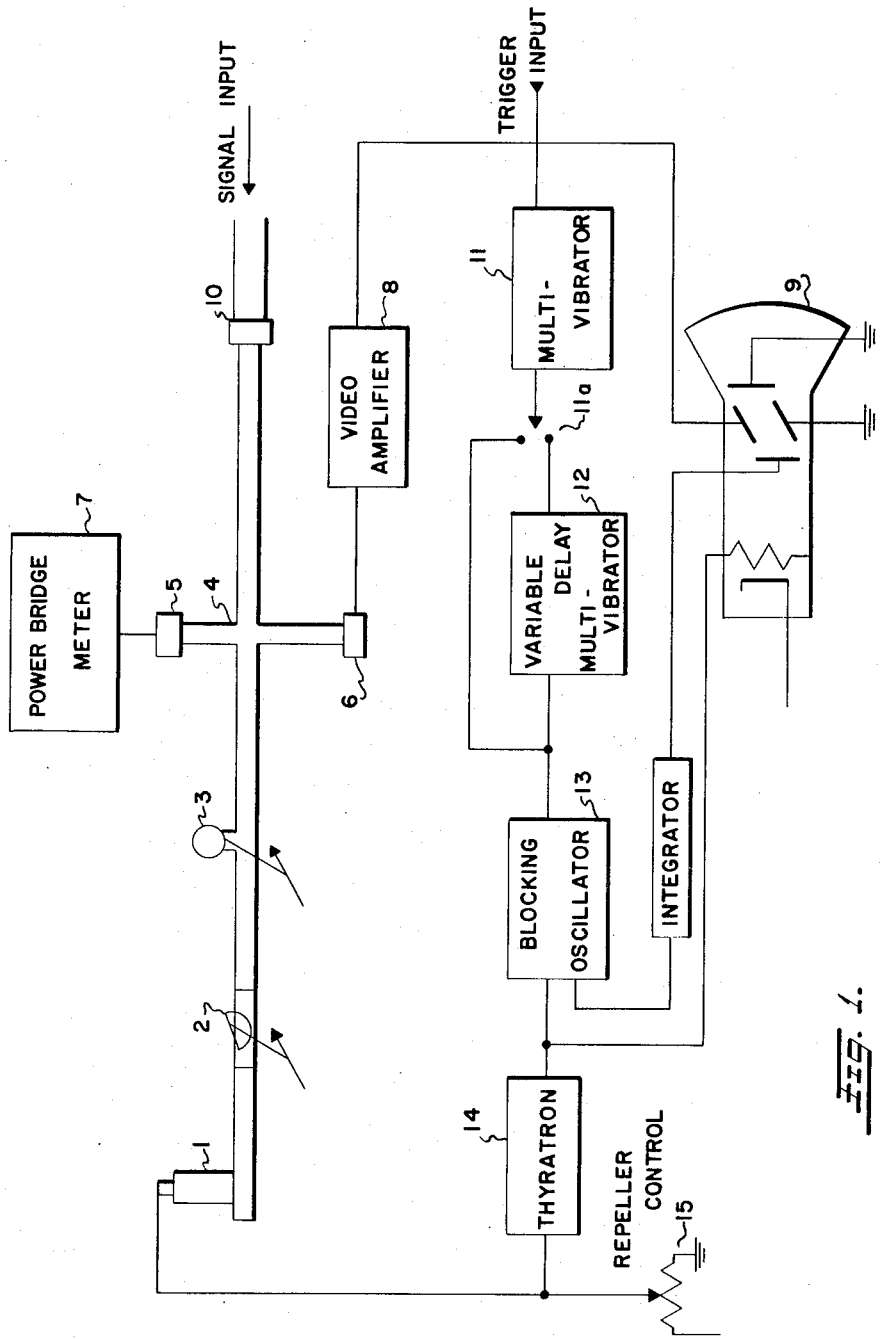

United States Patent Office 2,735,067
Patented Feb. 14, 1956

2,735,067

PEAK POWER METER

Elmer F. Deibler and Henry H. George, Silver Spring, Md., and Robert E. Miller, Stanford, Calif., assignors to the United States of America as represented by the Secretary of the Navy Application November 18, 1954, Serial No. 469,736

2 Claims. (Cl. 324—95)

The present invention relates to a method and apparatus for measuring the peak power of microwave pulse signals.

One of the values most frequently measured in a microwave receiver development program is that of the peak pulse power of input signals. This has been accomplished in the past by a technique involving the steps of: continuous wave square-wave power measurement, calibration of a synchroscope, and pulse substitution. This method has the disadvantages of being time consuming, and introducing possible errors of measurement. These errors arise because the synchroscope gain can be less at video frequencies than at square-wave frequencies, or the test set CW power not equal to its peak pulse power. In addition, systematic errors due to rearrangement of wave-guides affect the accuracy of calibration.

It is an object of this invention to provide a method and apparatus that will allow peak pulse power measurements to be made to a high degree of accuracy without the foregoing objections.

In general, the pulse peak power meter of the invention comprises a continuous wave microwave source, means for determining the power of the source, means for interrupting the continuous wave in synchronism with the signal pulse to be measured for a period greater than the period of the pulse, and means for simultaneously exhibiting a trace of the interrupted continuous wave and a trace of the signal pulse on an oscilloscope. The trace of the pulse will thus appear in the gap in the continuous wave trace and by adjusting the relative powers of the continuous wave and the signal pulse, the amplitude of the two traces can be made the same, thus providing a measurement of the peak power of the signal pulse.

The accuracy of the measurement is due to the fact that the continuous wave source has a high duty cycle, being interrupted only for very short periods so that it operates almost continuously and its output is a directly readable quantity. The method and apparatus of the invention eliminate the errors that occur in pulse power measurements where average pulse power is measured and multiplied by the pulse recurrence frequency divided by the pulse length.

The principles of the invention are illustrated in the accompanying drawings in which:

Fig. 1 is a circuit diagram of a pulse power measuring system embodying the principles of the invention;

Fig. 2a is a diagrammatic representation of a wave pulse whose peak power is to be measured;

Fig. 2b is a diagrammatic representation of an interrupted continuous wave providing a known power with which the pulse to be measured is matched;

Fig. 2c is a diagrammatic representation of the combined pulse and interrupted continuous wave;

Fig. 3a is a representation of an oscilloscope face showing the trace of the interrupted continuous wave; and Fig. 3b is a representation of an oscilloscope face showing the trace of the combined pulse and interrupted continuous wave.

As shown in Fig. 1, the C. W. power is generated by a klystron 1 and attenuated to the desired level by a waveguide pad 2. A wavemeter 3 is used to ascertain the frequency of the klystron. A magic tee 4 in the waveguide divides the continuous wave power equally between a barretter 5 and a microwave detector 6. The barretter 5 is part of the bridge circuit of the continuous wave power meter 7. The barretter is a device, commonly a suitable mounted short length of wire, typically of platinum, the resistance of which changes when it is subjected to microwave power due to the effect of the heat generated by the microwave power on the resistance of the wire. The change in resistance of the barretter measured by bridge 7 provides a measurement of the continuous wave power supplied to the magic tee 4. Because of the split effected by the magic tee, the power as measured is normally one-half of the power supplied to the tee. The output of the detector 6, which may be a crystal detector, is amplified by a video amplifier 8 and fed to an oscilloscope 9. The unknown microwave signal is fed in through precision attenuator 10 and is likewise divided by the magic T, equal parts passing to the barretter and the detector.

To provide interruptions in the continuous wave output synchronized with respect to the signal pulse, a triggering pulse derived from the signal is supplied to a multivibrator 11. A variable delay multivibrator 12 may be connected or by-passed by means of switch 11a. The delay multivibrator is not used when the minimum delay is required, that is, when the signal is to follow the trigger pulse by the least amount possible within the limits of the instrument.

The multivibrator 11, either directly or through the delay multivibrator 12, triggers the blocking oscillator 13 which provides a negative pulse of suitable duration that is integrated to provide a sweep voltage for oscilloscope 9, and a positive pulse which serves as an intensity control voltage for the oscilloscope. The latter pulse also triggers a hydrogen thyratron 14 to produce a negative pulse which switches off klystron 1 to provide the desired interruptions in its output. Typically, the pulses from blocking oscillator 13 are of five microseconds duration and the negative pulse from the thyratron is of two microseconds duration.

The interruption of the continuous wave power source produced an interrupted wave as illustrated in Fig. 2b. When applied to the oscilloscope, a trace having a notch $d$ appears, as shown in Fig. 3a. When the system is properly synchronized, the signal it is desired to measure arrives at the oscilloscope through magic tee 4, detector 6 and amplifier 8 at the time of the interruption of the continuous wave source, and by adjusting the delay multivibrator, the pulse signal $e$ can be centered in the notch $d$ providing the composite trace shown in Fig. 3b. Because of the splitting in the magic tee, the power of the pulse signal at detector 6 is one-half that supplied to the tee.

By adjusting the calibrated pad 2 and the precision attenuator 10, the displacement of the oscilloscope trace due to the pulse signal $e$ can be made equal to that due to the output of the klystron. This adjustment may be facilitated by providing a suitable amplitude reference line $f$ on the face of the oscilloscope.

In operation, it has been found that stable operation is obtained after a suitable warm-up period. The klystron repeller control 15 then is set for zero input as indicated on the oscilloscope and the C. W. power meter 7 adjusted to zero. The repeller is set for a clean negative pulse, and the frequency noted by adjusting the wavemeter 3 for a dip on the power meter. The delay multivibrator 12 is adjusted to position the pulse signal e in the notch d on the oscilloscope. The precision attenuator 10 in the signal waveguide is set to make the detected signal pulse match the deflection of the notch. The peak pulse power then equals the continuous wave power meter reading plus 3 decibels due to the magic-tee power split. The accuracy of the determination depends on the quality of the magic tee, but a correction can be obtained from a calibration curve of loss as a function of frequency. Accuracy is also dependent on having a well-matched barretter and crystal detector.

We claim:

1. A pulse peak power meter comprising in combination a magic tee, a continuous wave microwave power source connected to a first input arm of the magic tee, a calibrated attenuator in the input of the continuous wave to the magic tee, means connecting the signal pulse to be measured to a second input arm of the magic tee, a calibrated attenuator in the input of the signal pulse to the magic tee, a microwave power meter connected to a first output arm of the magic tee, a detector connected to a second output arm of the magic tee, a first multivibrator actuated by a signal derived from the signal source, a variable delay multivibrator having by-pass means arranged in parallel therewith, the variable delay multivibrator and by-pass means each being in series switching contact with the output of the first multivibrator, a blocking oscillator connected in series with and actuated by the output of the parallel arranged multivibrator and by-pass means, said blocking oscillator upon activation producing a negative pulse and a positive pulse, an oscilloscope having one pair of plates connected to the output of the detector for tracing the continuous wave and signal pulse and another pair of plates coupled to the output of the blocking oscillator to receive the negative pulse therefrom to control the sweep voltage of the oscilloscope, the positive pulse output of said blocking oscillator serving as an intensity control voltage for the oscilloscope, and a thyratron connected to the blocking oscillator to receive a positive pulse supplied therefrom, said thyratron having a negative pulse output produced when the thyratron is triggered by the pulse received from the blocking oscillator, the thyratron output negative pulse being electrically connected to the continuous wave microwave power source to interrupt the production of the continuous wave for a duration determined by the first multivibrator and selectively the delay multivibrator such that a simultaneous exhibit of the trace of the interrupted continuous wave and a trace of the signal pulse appears on the oscilloscope.

2. A pulse peak power meter as described in claim 1 wherein said power source comprises a klystron and including repeller control means for adjusting the klystron to produce a clean negative pulse, and means in the input of the continuous wave to the magic tee to ascertain the frequency of the klystron negative pulse in order that the power meter may be brought to an accurate operating condition.

References Cited in the file of this patent

UNITED STATES PATENTS

| | | |
|---|---|---|
| 2,434,334 | Sheppard | Jan. 13, 1948 |
| 2,597,327 | Hollingsworth | May 20, 1952 |